(12) United States Patent
Dharap

(10) Patent No.: US 6,892,206 B2
(45) Date of Patent: May 10, 2005

(54) REDUCTION OF META DATA IN A NETWORK

(75) Inventor: Sanjeev Dharap, Fremont, CA (US)

(73) Assignee: Yahoo! Inc., Sunnyvale, CA (US)

(*) Notice: Subject to any disclaimer, the term of this patent is extended or adjusted under 35 U.S.C. 154(b) by 569 days.

(21) Appl. No.: 09/938,799

(22) Filed: Aug. 24, 2001

(65) Prior Publication Data

US 2002/0026460 A1 Feb. 28, 2002

Related U.S. Application Data

(60) Provisional application No. 60/229,662, filed on Aug. 31, 2000.

(51) Int. Cl.[7] .............................................. G06F 17/30
(52) U.S. Cl. ............................. 707/101; 707/2; 707/6; 707/10
(58) Field of Search .......................... 707/2, 6, 10, 101, 707/100, 7; 715/513, 501; 709/219

(56) References Cited

U.S. PATENT DOCUMENTS

| | | | |
|---|---|---|---|
| 5,446,916 A | 8/1995 | Derovanessian | 395/800 |
| 5,530,757 A | 6/1996 | Krawczyk | 380/23 |
| 5,614,899 A | 3/1997 | Tokuda | 341/51 |
| 5,673,043 A | 9/1997 | Hayashi | 341/106 |
| 5,684,990 A | 11/1997 | Boothby | 395/619 |
| 5,813,007 A | 9/1998 | Nielsen | 707/10 |
| 5,933,606 A * | 8/1999 | Mayhew | 709/239 |
| 5,977,969 A | 11/1999 | DiAngelo | 345/339 |
| 6,230,168 B1 * | 5/2001 | Unger et al. | 715/501.1 |
| 6,360,254 B1 * | 3/2002 | Linden et al. | 709/219 |
| 6,370,581 B2 * | 4/2002 | Rader | 709/230 |
| 6,418,421 B1 * | 7/2002 | Hurtado et al. | 705/54 |
| 6,585,777 B1 * | 7/2003 | Ramaley et al. | 715/513 |
| 2001/0044852 A1 * | 11/2001 | Rader | 709/236 |
| 2002/0032626 A1 * | 3/2002 | DeWolf et al. | 705/35 |

OTHER PUBLICATIONS

Stuart E. Madnick, "String processing techniques", ACM, vol. 10, No. 7, Jul. 1967pp. 420–424.*

Martin A. Goetz, "Design and Characteristics of a variable length record sort using new fixed–length", ACM, vol. 6, No. 5, May 1963, pp. 264–267.*

Heinz et al., "Performance of data structures for small sets of strings", pp. 87–94.*

Heinz et al., "A fast efficient data structure for string keys", vol. 20, No. 2, Apr. 2002, pp. 192–223.*

Powell, T. and Lima, J., "*The challenges of a wireless Web,*" Network World Fusion, Mar. 20, 2000, http://www.nwfusion.com/archive/2000/89695_03-20-2000.html.

* cited by examiner

Primary Examiner—Jean M. Corrielus
(74) Attorney, Agent, or Firm—Fliesler Meyer, LLP

(57) ABSTRACT

A method of encoding data strings in a web page, comprising mapping the data strings to a fixed-length string; replacing said data strings in the web page; and transmitting the page with said fixed-length strings.

20 Claims, 4 Drawing Sheets

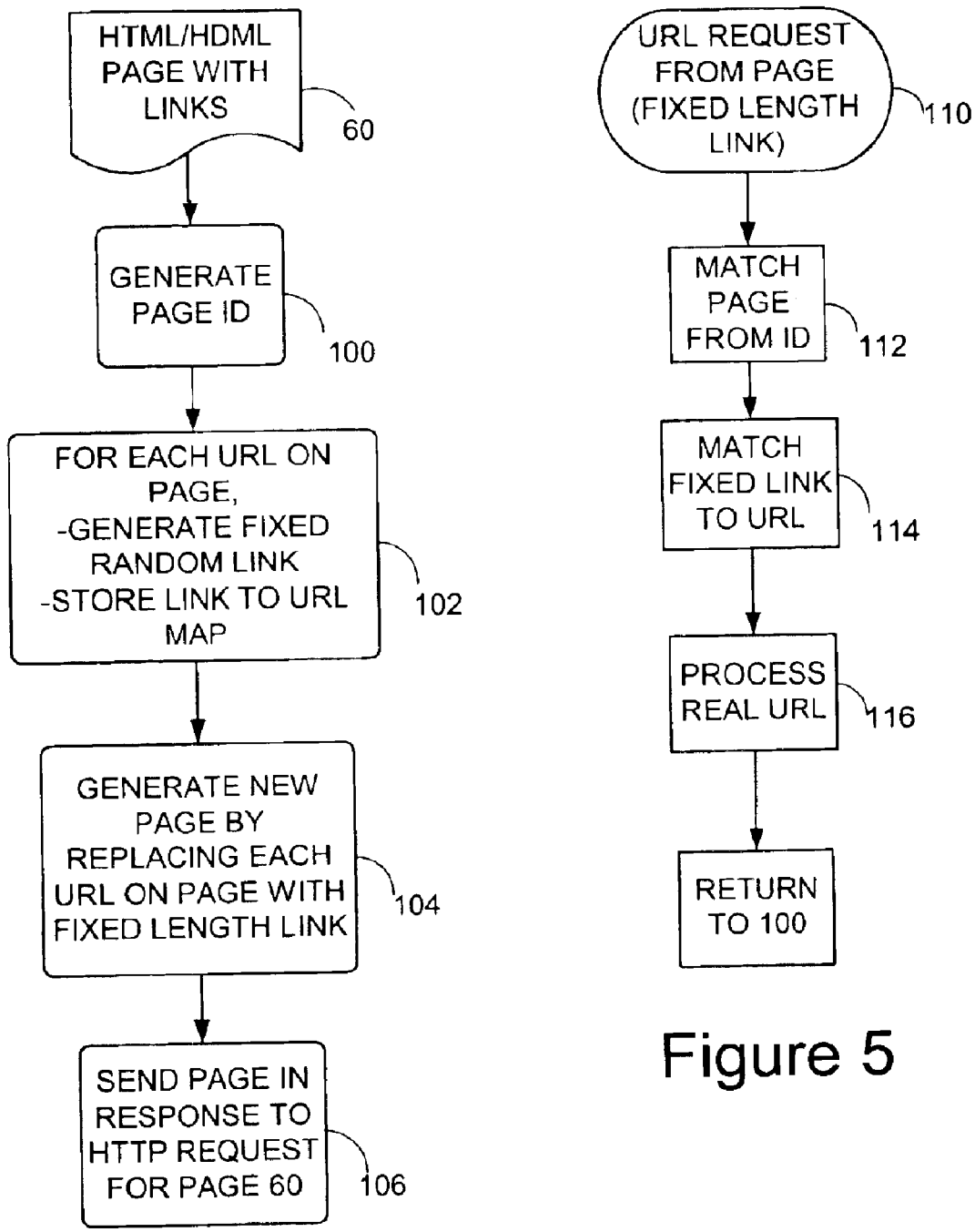

REDUCTION OF META DATA IN A NETWORK

CLAIM OF PRIORITY

This application claims priority from U.S. provisional patent Application Ser. No. 60/229,662, entitled "REDUCTION OF META DATA IN A NETWORK," filed Aug. 31, 2000, incorporated herein by reference.

FIELD OF THE INVENTION

The invention relates to the transfer of information over limited bandwidth networks, particularly, wireless networks, and specifically to the transfer of information intended for display on wireless Internet devices.

BACKGROUND

Currently, a number of different technologies seek to provide the benefits of the Internet, and the World Wide Web in particular, to users any time and anywhere they desire it through wireless technologies. However, both the wireless devices used to access the Internet and the networks which carry information to those devices have a number of limitations.

Wireless devices are significantly smaller and less powerful than desktop or laptop devices traditionally used to access the World Wide Web via a web browser. In addition, the wireless networks which connect these wireless devices to the Internet do not have the same bandwidth as land-based "wire line" systems, and provide this limited bandwidth at a higher cost, more limited availability and lower quality of service when compared with land-based systems.

One attempt to address the limitations mentioned above is utilized by the Palm VII® wireless personal assistant and is known as "clipping." In the Palm® system, a customized wireless application is written and deployed in two parts: a Web-based back-end, which serves dynamic content, and a Palm query application (PQA), which resides on the Palm VII® itself. The disadvantage of the Palm system is that its proprietary nature requires that only certain types of pages be available to the Palm device. In effect, the PQA takes a "clipping" from the website with which it is permanently associated. This means that for each site, the content distributor must write and distribute a PQA that contains all the menus and forms needed to input and output data on that site. This requires hosting extra files to build the clippings on the fly using any number of standard blank applications such as cold fusion, active server pages, or CGI. The advantage of clipping is that it keeps costly wireless transactions to a minimum. Only the information that needs to be updated is sent over the radio network. The downside is that all interactions with the website must be planned ahead of time and introduction of new material requires writing and compiling a new version of the PQA. Nor can users freely browse a large site on their own to find what they need.

One wireless application solution which is gaining popularity is wireless application protocol (WAP). WAP is a standard for bringing together wireless telephones and Internet content services regardless of the wireless network architecture or device type. WAP is designed to work with any type of underlying wireless network architecture, thereby freeing the provider to concentrate on the wireless application itself.

As shown in FIG. 1, the WAP model presupposes a user agent 10, such as a cellular telephone or personal digital assistant (PDA), which is equipped with a micro browser. The WAP client 10 communicates directly with a server on the Internet 25 via a WAP gateway 20 as shown in FIG. 1. The WAP gateway server sits between a wireless carrier's network 15 on one side and the public Internet 25 on the other. (This configuration need not be limited to the public Internet, but may include private Intranets, so that gateways can be located within the carrier or corporate firewalls or both.) The WAP gateway 20 handles the interface between the two sets of network protocols, wireless WAP and wire-line TCP/IP. The WAP gateway 20 decodes and decompresses wireless terminal requests and sends it on to the appropriate web server as an ordinary HTTP request.

Certain wireless carriers have already implemented WAP gateways. If a standard HTML document is served in response to an HTTP request from a PDA 10, the WAP gateway implements content translation before the request can be relayed back to the WAP client 10. The WAP gateway 20 also imposes data quantity limits on client responses. The gateway limitation means that for each given transaction, only a limited number of bytes may pass through the gateway. This so-called "gateway limit" defines the actual amount of data which may be returned in response to an HTTP request.

Generally, WAP gateways have some form of limitation on the amount of data which is transmitted to the client 10. In some cases, the gateway limitation is at or about 1492 bytes. Hence, this presents an additional problem to content providers to design pages and applications which can provide useful content and information to a WAP client 10.

Typically, data which is sent by web pages contains both data which the user sees and "meta-data" or information about the data in the web page that is used for a number of purposes, that the users generally do not see. For example, meta-data can include a number of meta "tags" identifying to search engines the type of document which is coded in a markup language (HTML, HDML, etc.) in order to allow search engines to quickly determine the type of document it is and return information on the document to users. Other types of lengthy data in web pages may include URLs (universal resource locators) which, given the nature of the Internet and the World Wide Web at present, can be very long. For example, many Internet websites today provide e-mail services to clients. A URL for an e-mail can be quite long, since the URL contains server information as well as user identification information. Such URLs can easily be 200 bytes in length, and may be embedded in a document and hence unseen to a user.

Long URLs can be particularly problematic for portal sites which seek to provide the user with a customized home page tailored to the user's own design. Such sites allow the user to define the user's specific interests and activities such as mail, local information including weather, movie information, directions, etc., or other personalized information that the user wishes to see when they log on to their personal site. In such a case, links to each of the aforementioned types of information must provide, in the link, specific identification information regarding the type of information which the user seeks to retrieve (i.e. "provide weather information for San Francisco, Calif."). Hence, it is quite conceivable that a user's customized homepage could have any number of long URL links. Translating this page to a wireless portal, given the WAP gateway limitations mentioned above, would quickly occupy the amount of available bandwidth to transmit the document via gateway to user.

In view of the foregoing, techniques which reduce the bandwidth required by such pages and other Internet data are desirable. In addition, providing data efficiency without reducing functionality or features is desirable.

SUMMARY

An embodiment of the invention, roughly described, comprises a method of encoding non-displayed data in a web page. In one aspect, the method comprises mapping data strings in a web page to a fixed-length string prior to sending the web page to a user; replacing said data strings in the web page with the fixed-length strings; and transmitting the page with said fixed-length strings.

According to another aspect, the invention comprises a method of converting meta-data in a web page to a fixed-length string. The method includes the steps of converting a string of meta-data to a fixed-length string; replacing the string of meta-data in the web page with the fixed-length string; and transmitting the page.

BRIEF DESCRIPTION OF THE DRAWINGS

The invention will be described with respect to the particular embodiments thereof. Other objects, features, and advantages of the invention will become apparent with reference to the specification and drawings in which:

FIGS. 4 and 5 are flow charts representing a first embodiment of a method of the present invention for installing and utilizing fixed-length URLs in web pages;

DETAILED DESCRIPTION

Embodiments of the present invention seek to reduce the amount of data which is transmitted via a wireless network to increase efficiency of the network, without reducing the amount of information contained in the transmitted information. As a consequence, the perceived page size returned in response to an HTTP request is increased and the perceived speed of the network is improved. In accordance with an embodiment of the present invention, data of varying lengths is replaced with fixed-length data prior to transmission via the network. Requests for and references to the fixed-length data are referenced to the original data via an intermediate server and the original data manipulated in accordance with its intended use. In one embodiment, each URL in a web page which is to be transmitted via a gateway is reduced to a fixed length prior to transmitting the page. This fixed length, which may be in one example, 20 bytes, substantially increases the allowable amount of displayable information which may be provided in the page within the gateway limitation of the particular system.

Figure 1:
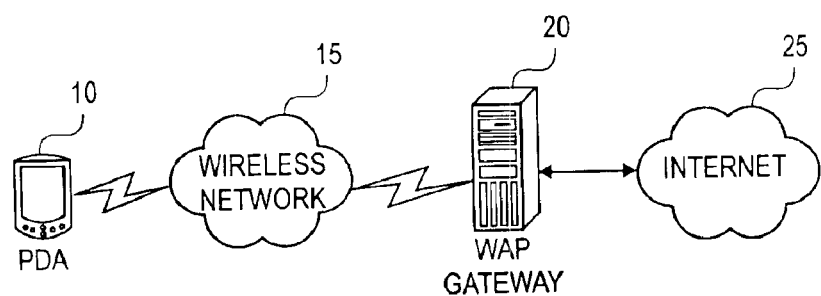
FIG. 1 is a block diagram of a wireless device coupling to an Internet view of a WAP gateway.
Figure 2:
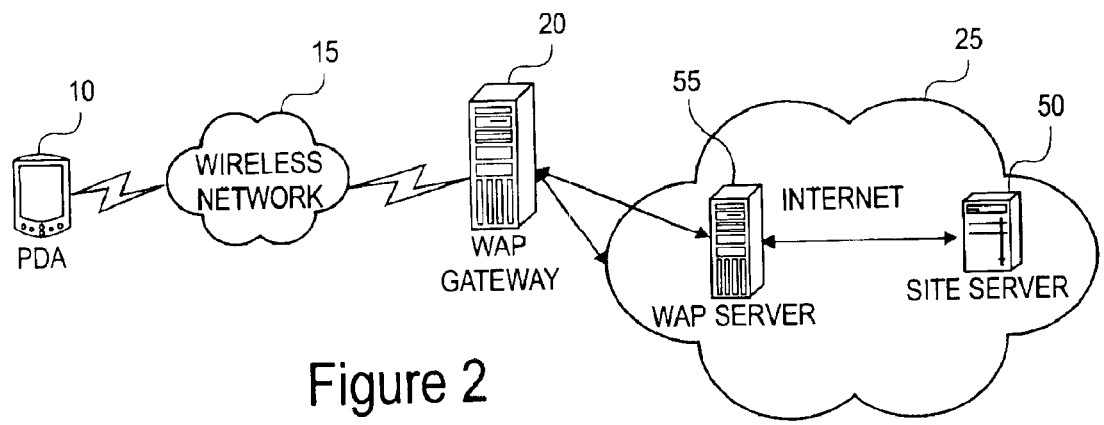
FIG. 2 is a block diagram of a network used in accordance with an embodiment of the present invention.

FIG. 2 shows a wireless client device 10 which may be a personal digital assistant, a wireless Internet-enabled cellular phone, or any other device capable of accessing a wireless network 15 which is coupled to a WAP gateway 20. Within the public Internet 25, a particular website server 50 is coupled via WAP server 55 to provide wireless formatted content information to the wireless client 10.

In accordance with an embodiment of the invention, the WAP server 55 receives content directly from site server 50, and in one embodiment, the present invention includes a series of processes enabled to process data on the WAP server 55 to perform a method of the invention. In one aspect, such processes convert URLs in a given page of web content to fixed-length URLs, and maintain a correlation between the fixed-length URL and the original URL to enable a user utilizing client 10 to access data on the site server 50. Such correlation can be a table mapping fixed to variable-length data, or a reversible hash with keys tracked on a page or data-specific basis. In another embodiment, any meta-data string in a page may be converted to a fixed length and retrieved.

Figure 3:
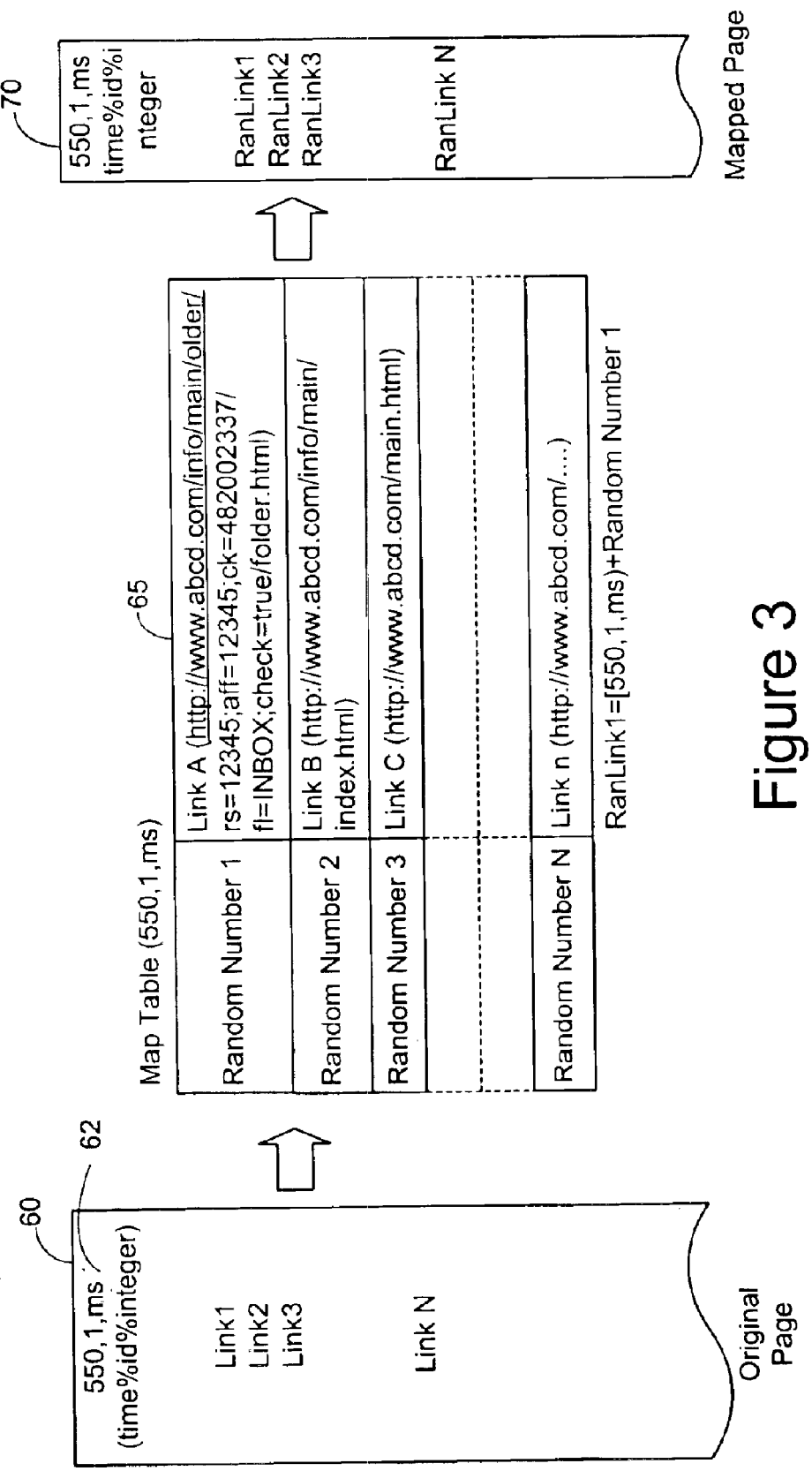
FIG. 3 is a graphic depicting the URL linking and reduction table mapping of the method of an embodiment of the present invention.

FIG. 3 shows a first embodiment of the system and method of the present invention in an implementation for reducing data to a fixed length. As shown in FIG. 3, each page 60 which is provided from site server 50 through WAP server 55 to PDA 10 in response to an HTTP request from PDA 10 has a unique identifier 62. The unique identifier 62 may be, in one embodiment, a time mark in milliseconds, a page identifier, and a running integer (time%id%integer). The time in milliseconds may be derived from a single epoch, which in one embodiment is the operating system's time for the operating system running the processes implementing an embodiment of the present invention. Since site server 50 is capable of processing multiple pages in a single millisecond, the per-page ID and user ID as set forth above provide a unique identifier 62 per page. However, it should be recognized that the unique identifier 62 may take many forms and any number of identification schemes to provide a unique identifier 62 for page 60 in FIG. 3 may be utilized in accordance with various embodiments of the present invention. As long as the identifier is unique, any format of identification will suffice.

Mapping table 65 is maintained for each uniquely-identified page 60 provided by the processing server, in one case WAP server 55. Table 65 shows mapping of URLs, but the mapping may occur for any URL or meta-data in a page. Each link in the table represented in column 2 of table 65 is, in a first embodiment of the invention, mapped to a specific random URL identifier shown in column 1. In this way, the long URLs are directly associated with the fixed-length URL and the longer URLs may be retrieved at a later time in accordance with a method of the present invention.

The random link in column 1 may be generated in any number of ways, as long as a fixed-length unique number is provided for each link. Given the number of links in even the longest web page, a 20 byte link is sufficient to ensure unique randomness for each table 65 associated with a unique page 60.

Each actual link in page 60 (Link 1, Link 2, Link 3 . . . ) is then replaced with its corresponding fixed-length link (RanLink 1, RanLink 2 . . . etc.) to generate a shortened, mapped page 70. Each random link incorporates the page ID and the randomly-generated number associated with the specific link it replaces.

FIG. 4 represents a first embodiment of a method shown in FIG. 3 whereby a web page incorporating a number of long meta-data strings are replaced with fixed-length strings in accordance with an embodiment of the present invention. Again, the method is described, for example purposes only, in the context of URLs.

As one who is skilled in the art would appreciate, FIGS. 4–7 illustrate logic boxes for performing specific functions. In alternative embodiments, more or fewer logic boxes may be used. In an embodiment of the present invention, a logic box may represent a software program, a software object, a software function, a software subroutine, a software method, a software instance, a code fragment, a hardware operation or user operation, singly or in combination.

At logic box 100 in FIG. 4, a web page 60 is received and a unique page ID, in accordance with the foregoing description, is generated.

Once a unique ID is generated, at logic box 102, for each URL on the page, a fixed random link is generated and the random fixed-length link is stored with the associated real URL in a table 65 as shown in FIG. 3. In accordance with the method of the invention shown in FIG. 4, any fixed-length hash, such as the MD5 hash, may be utilized to generate the fixed-length URL identifier. MD5 hash is an algorithm which is known in the art. MD5 hash is often used to create a digital fingerprint or "message digest" of an input message.

At logic box 102, this fixed-length mapping table is stored on a process server (WAP server 55, content server 50, gateway server 20, or any other process server configured to implement an embodiment of the present invention) as shown in FIG. 2. Table 65 may be stored for any length of time, generally two to six hours, within which a user might be likely to return to this page and require the reference to the fixed-length URL to be transmuted back to the regular URL to retrieve the page.

Once table 65 is generated, at logic box 104, a new page 70 is generated by replacing each of the original URLs on page 60 with the corresponding fixed-length link. The replaced page is then transmitted at logic box 106 to the requesting user in response to the original HTTP request for page 60.

Once the fixed-length page 70 is received by the user in place of the original page 60, it is likely that the user will select one or more of the links replaced by the method of FIG. 4. FIG. 5 shows a method for processing an HTTP request incorporating a fixed-length link received from a client device 10 after it receives a mapped page 70 from logic box 106 of FIG. 4, according to an embodiment of the present invention.

Once a URL request 110 is received, the page ID incorporated into the link is matched at logic box 112 with the correct link table 65 and the specific fixed-length link is matched to the original URL at logic box 114. Next, at logic box 116, the real URL is processed and an HTTP request for the page referenced by the real URL is sent, the real page retrieved, and the real page processed in accordance with the method of FIG. 4 (or the alternative method of FIG. 6, described below).

Figures 6, 7:
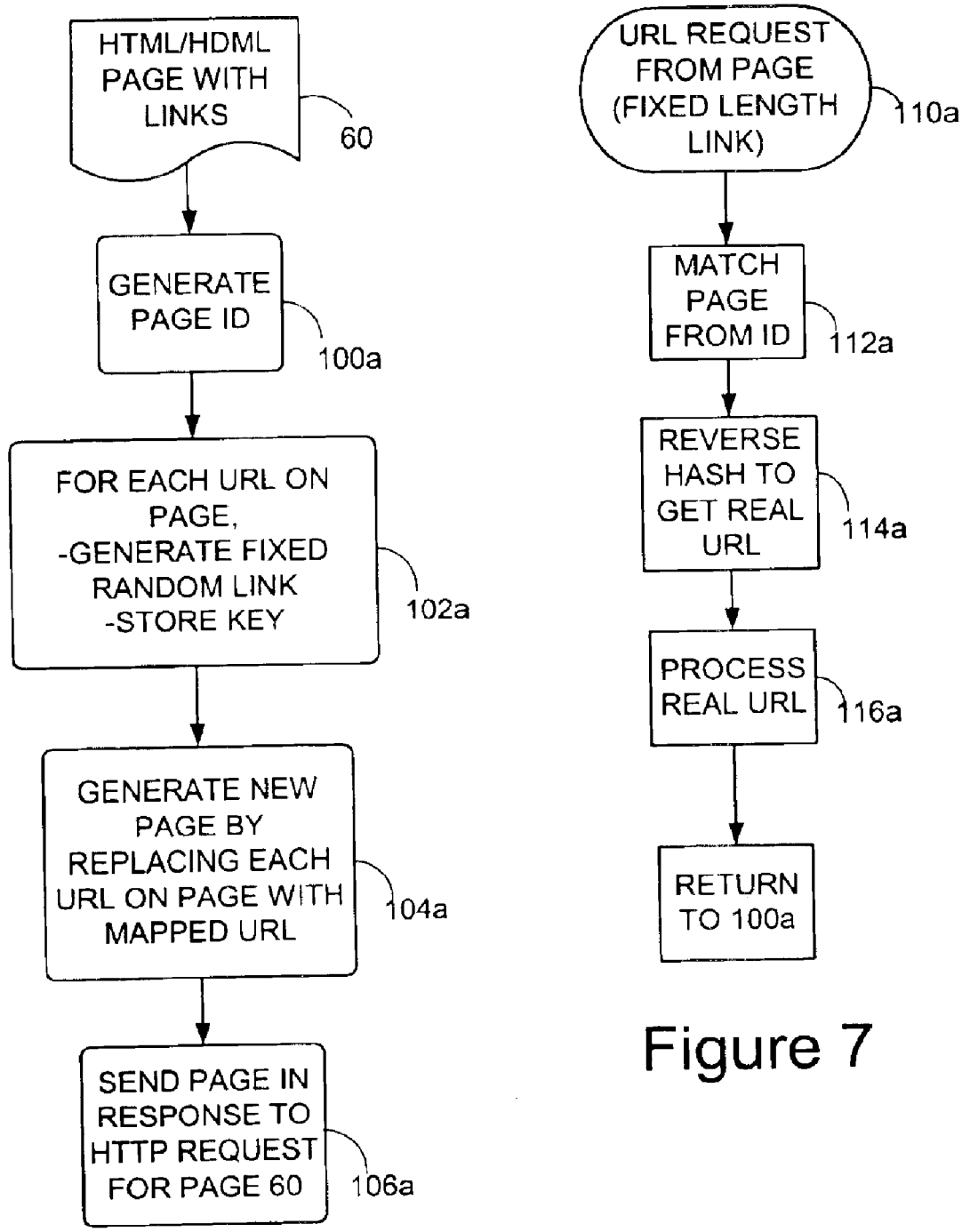
FIGS. 6 and 7 are flow charts representing a second embodiment utilizing a two-way hash to incorporate fixed-length URLs in web pages in accordance with the present invention.

FIGS. 6 and 7 show an alternative embodiment of the present invention wherein the tables 65 shown in FIG. 3 need not be utilized. As shown in FIG. 6, a web page with a number of URL links may be processed using a two-way hash algorithm, with the server retaining on a page-wise basis a key to reverse the hashing algorithm and thereby return the original URL. In accordance with this aspect of the present invention, a unique page ID is generated at logic box 100a, and at logic box 102a, for each URL on the page, a fixed random link is generated and a key for reversing the hashing algorithm is stored. In an embodiment, the key may be generated using MD5 hash, or may be any randomly-generated number which is unique.

Next, at logic box 104a, each random link is inserted into a new, mapped page which is sent at logic box 106a in response to the original HTTP request for page 75.

In this embodiment, the table 65 of FIG. 3 need not be generated or stored, but the key for reversing the hash is stored on a page-wise, link-wise or other level, in order to retrieve the original URL from the random link on page 60. The key for the hash may be retained on a page-by-page basis.

When a URL request from a page incorporating the fixed-length URL 110a is received, as shown in FIG. 7, once again the page ID is matched at logic box 112a, and at logic box 114a a reverse hash is performed to determine the original URL based on the key associated with the page. Once again, following generation and acquisition of the original URL from page 60, the URL is processed at logic box 116a and the method may return to processing the next HTML page.

In accordance with an embodiment of the present invention, the amount of data per page transmitted to wireless devices via a wireless network is reduced without lessening the amount of information which is available to the user, and a cost savings in bandwidth is provided. The invention may be applied to any string of data in a web page which is not generally displayed to a user, however, the invention could be applied to reduce visible strings of data as well. For example, long URLs may be reduced to a fixed byte length, providing the added benefit that the URL is now encrypted in transmission. Since in general, users of wireless networks pay premiums for the amount of bandwidth utilized and the amount of time the user is coupled to the wireless network, users see an overall cost savings. Thus, reducing the amount of data transmitted per unit of bandwidth increases value to the user. In addition, while the actual speed of the network is not improved, the perceived speed of the network is improved since the users retrieve more content per unit of bandwidth and less URL space is required in each transaction.

While certain specific gateway data limitations have been herein mentioned, it should be recognized that any particular gateway limitation may be utilized and the specific values of 1492 bytes for the gateway limitation, 20 bytes for the fixed-length link, and the like, are exemplary only.

The aforementioned benefits of perceived speed and reduction of data per unit of bandwidth while providing the same content per unit of bandwidth are achievable in non-wireless networks as well. The system of the present invention also increases the perceived time that a page is rendered since the processing occurring on the back end is relatively quick and much faster than the transmission latencies involved in processing the page transmission via a wireless network.

In addition, the invention is not limited to use with links or URLs. Any meta-data stream can be reduced prior to transmission of the stream to the user, since a user on a wireless client would likely have little use for such meta-data.

These and other advantages of the present invention will be readily apparent to one of average skill in the art. All such features and advantages of the invention are intended to be within the scope of the invention as illustrated by the written description and the drawings, and defined by the attached claims.

What is claimed is:

1. A computer implemented method of processing a data string in a web page, comprising:

mapping data string to a fixed-length string, wherein said fixed length string includes a unique identifier associating said data string with said web page;

replacing the data string in the web page with the fixed-length string;

maintaining a correlation between the fixed-length string and the data string such that the data string can be determined using the fixed-length string, wherein the correlation is memory-based with a table mapping the fixed length string to the data string, or function-based with a reversible hash correlating the fixed length string and the data string; and transmitting the page with said fixed-length string.

2. The method of claim 1 wherein the method is performed on a web server which provides said web page.

3. The method of claim 1 wherein said method is performed on an intermediate server which receives said web page from a web content server.

4. The method of claim 1 wherein said web page has a unique page ID.

5. The method of claim 1 wherein said step (a) comprises generating a random identifier for said data string and creating a table associating said random identifier with said data string.

6. The method of claim 1 wherein said data string comprises at least one universal resource locator.

7. The method of claim 1 wherein said data string comprises meta-data.

8. The method of claim 1 wherein said data string comprises a plurality of universal resource locators, each said universal resource locator being mapped into a table uniquely associated with said web page, each said universal resource locator having a unique identifier.

9. The method of claim 1 wherein said step (b) comprises generating a new web page wherein said data string is replaced with said fixed-length string.

10. The method of claim 9 wherein said data string comprises a plurality of universal resource locators, and each said universal resource locator is replaced with a fixed-length string.

11. A computer implemented method of converting meta-data in a web page to a fixed-length string, comprising:

converting a string of meta-data to a random fixed-length data string, wherein said fixed length string includes a unique identifier associating said string with said web page;

associating the string of meta-data with the fixed-length data string;

replacing the associated string of meta-data in the web page with the fixed-length data string;

maintaining a correlation between the fixed-length string and the metadata such that the data string can be determined using the fixed-length string, wherein the correlation is memory-based with a table mapping the fixed length string to the string of metadata, or function-based with a reversible hash correlating the fixed length string and the metadata; and transmitting the page with said fixed-length string.

12. The method of claim 11 wherein said step (a) comprises performing a fixed-length hash on said data string, uniquely identifying said web page, and combining said uniquely identified said web page with said fixed-length hash.

13. The method of claim 11 wherein said step (a) comprises performing a reversible hash on said string of meta-data and associating a key with said web page.

14. A method of processing a web page, including a string of meta-data transmitted on a network, comprising:

converting a string of meta-data to a fixed-length string, wherein said fixed length string includes a unique identifier associating said data string with said web page;

mapping said string meta-data to a fixed-length string;

maintaining a correlation between the fixed-length string and the string of meta-data such that the string of meta-data can be determined using the fixed-length string, wherein the correlation is memory-based with a table mapping the fixed length string to the string of meta-data, or function-based with a reversible hash correlating between the fixed length string and the string of meta-data; and transmitting the fixed-length string with in place of the string of meta-data.

15. The method of claim 14 wherein said web page is provided with a unique ID.

16. The method of claim 14 wherein said step (a) comprises generating a random identifier for said fixed-length string and creating a table associating said random identifier with said fixed-length string.

17. The method of claim 14 wherein said string of meta-data comprises at least one universal resource locator.

18. The method of claim 14 wherein said step (b) comprises generating a new web page wherein said meta-data string is replaced with said fixed-length string.

19. The method of claim 14 wherein said step (a) comprises performing a fixed-length hash on said meta-data, uniquely identifying said web page, and combining said unique identifier for said web page with said fixed-length hash.

20. A computer implemented method of processing a web page comprising:

converting a URL on a first web page into a fixed-length string which is transmitted to a user, wherein said fixed length string includes a unique identifier associating said data string with said web page;

mapping said URL to a fixed-length string;

maintaining a correlation between the fixed-length string and the URL such that the URL can be determined using the fixed-length string, wherein the correlation is memory-based with a table mapping the fixed length string to the URL or function-based with a reversible hash correlating the fixed length string and the URL;

receiving a request from the user for information associated with the fixed-length string;

determining the URL from the fixed-length string; and using the URL associated with the fixed-length string to find a second page to provide information to the user.

* * * * *